US012745700B2

(12) United States Patent
Ensminger et al.

(10) Patent No.: US 12,745,700 B2
(45) Date of Patent: Sep. 29, 2026

(54) ADJUSTABLE JOINT FOR EXAMPLE FOR A GRAIN UNLOADING SYSTEM OF A COMBINE HARVESTER

(71) Applicant: AGCO Corporation, Duluth, GA (US)

(72) Inventors: Nathan K. Ensminger, South Hutchinson, KS (US); Dino Rey Valdez, Hesston, KS (US); Bernard Dean Regier, Hesston, KS (US); Bryan S. Claerhout, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 464 days.

(21) Appl. No.: 18/354,112

(22) Filed: Jul. 18, 2023

(65) Prior Publication Data

US 2024/0065150 A1 Feb. 29, 2024

Related U.S. Application Data

(60) Provisional application No. 63/373,918, filed on Aug. 30, 2022.

(51) Int. Cl.

| | |
|---|---|
| ***A01D 41/12*** | (2006.01) |
| ***A01D 43/073*** | (2006.01) |
| ***A01D 43/08*** | (2006.01) |

(52) U.S. Cl.

CPC ....... *A01D 41/1217* (2013.01); *A01D 43/073* (2013.01); *A01D 43/087* (2013.01)

(58) Field of Classification Search

CPC . A01D 41/1217; A01D 43/073; A01D 43/087

See application file for complete search history.

(56) References Cited

U.S. PATENT DOCUMENTS

| | | | | |
|---|---|---|---|---|
| 3,341,229 | A | 9/1967 | De Wilde | |
| 4,662,812 | A * | 5/1987 | Busboom | A01D 41/1217 414/505 |
| 10,292,330 | B2 * | 5/2019 | Borry | A01D 61/004 |
| 12,545,523 | B2 * | 2/2026 | Hughes | A01D 90/10 |
| 2009/0245704 | A1 * | 10/2009 | Gustafson | F16C 23/04 403/115 |
| 2010/0016046 | A1 * | 1/2010 | Coers | A01D 41/1217 460/114 |
| 2019/0059217 | A1 * | 2/2019 | Matousek | A01F 12/46 |

FOREIGN PATENT DOCUMENTS

| | | | | |
|---|---|---|---|---|
| BR | 102017017408 B1 * | 5/2022 | | A01D 41/1274 |
| EP | 0274761 A1 * | 7/1988 | | A01D 41/1217 |
| GB | 1210044 A | 10/1970 | | |

OTHER PUBLICATIONS

UK Intellectual Property Office, Search report for related UK Application No. GB2213552.9, dated Feb. 21, 2023, 3 pages.

* cited by examiner

*Primary Examiner* — Ernesto A Suarez

(57) ABSTRACT

An adjustable joint is to be provided along a tube, such as a grain unloading tube of a combine harvester. A bearing system is provided between the facing end of first and second tubes. allowing a controllable bend to be provided between the first tube and the second tube. The bearing system is actuated to control the bend. The bearing system has first and second first tubular wedges which face each other at the sloped ends, and bearings around the outside ends and the facing ends. A relative rotation angle is set between the first and second tubular wedges to set the degree of bend.

13 Claims, 19 Drawing Sheets

ADJUSTABLE JOINT FOR EXAMPLE FOR A GRAIN UNLOADING SYSTEM OF A COMBINE HARVESTER

CROSS-REFERENCE TO RELATED APPLICATION

This application claims the benefit of U.S. Provisional Application No. 63/373,917, filed Aug. 30, 2022, which is incorporated herein by reference in its entirety.

FIELD

Embodiments of the present disclosure relate generally to adjustable joints for material-conveying tubes, such as the grain unloading system used within a combine harvester.

BACKGROUND

A combine harvester typically includes a threshing system for detaching grains of cereal from material other than grain, such as cobs, stems and seed pods, a separating apparatus downstream of the threshing system, and a grain cleaning apparatus for receiving grain from the separating apparatus. A stratification pan aims to stratify the material into a layered structure of grain at the bottom and light chaff and other material other than grain (MOG) at the top. The grain is collected in a grain tank, and from the grain tank the grain can be unloaded, for example to a trailer pulled by a tractor which runs alongside the combine harvester.

The grain unloading system typically comprises an auger for lifting the grain from the grain tank and an unloading tube, also including an auger, which extends from the top of the auger across to a location above the tractor trailer. The auger is typically driven by a pulley system with a belt (or chain). The unloading system is turned on and off to control the emptying of the grain tank.

The unloading tube has a sufficient length to reach over the top of the combine harvester to the tractor trailer or other unloading vehicle. The unloading tube has an end lip, and the tube can be pivoted up and down, so that the end lip can be lifted over the edge of the trailer and lowered down into the trailer (to prevent a long flow of grain being exposed to wind). The unloading tube also can be pivoted forward and backward so that it can be stowed when not in use, without increasing the width of the combine harvester during transportation. Rotating the unloading auger can also be used to help to distribute the grain in the trailer.

This invention relates in particular to the coupling between the lifting auger and the unloading auger. WO 2021/144631 discloses inflow and outflow augers rotatably coupled together within respective tubes, with the tubes coupled at a ball joint.

There is a need for an improved bendable auger connection, in particular with a strong connection.

BRIEF SUMMARY

The invention is defined by the claims.

According to examples in accordance with the invention, there is provided an adjustable joint to be provided between first and second tubes, comprising:

- a first end for connecting to the first tube;
- a second end for connecting to the second tube;
- a bearing system between the first end and the second end, allowing a controllable bend to be provided between the first tube and the second tube; and
- an actuator system for controlling the bearing system to control the bend, wherein the bearing system comprises:

- a first tubular wedge having a first outside end lying in a plane parallel to the first end and a first inside end lying in a plane offset from parallel to the first end;
- a second tubular wedge having a second outside end lying in a plane parallel to the second end and a second inside end lying in a plane parallel to the first inside end, the first and second inside ends facing each other;
- bearings around the first and second outside ends and one or both of the first and second inside ends, and wherein the actuator system is for setting a relative rotation angle between the first and second tubular wedges.

The adjustable joint allows a bend to be controlled in the unloading tube, and in particular the transport section of the grain unloading tube. This bend allows the end of the grain unloading tube, for example with an end lip, to be raised (e.g. over the edge of a trailer) and lowered (e.g. so that an end spout is within the trailer volume). There are three bearings. One bearing connects the facing, inner, ends of the tubular wedges and the other two are at the outer edges of the tubular wedges. The bearings at the outer edges are thus perpendicular to the axis of the connected tubes, whereas the bearings at the inner edges are at an angle to that perpendicular direction. The slopes are the same, and the coupling using these two sloped edges means the tube can be moved in a single plane (e.g. a vertical raising and lowering plane) rather than in a circular motion as would be exhibited by using a single tubular wedge. The design provides a very strong connection for a bendable auger to process in-line crop flow. The last bearing in the crop flow can also be used to rotate the second tube, and hence rotate the end lip, and thereby help with distribution of the crop in the target vehicle.

The actuator system for example comprises a piston which drives an actuator arm, wherein the actuator arm is connected to the first and second tubular wedges for rotating the first and second tubular wedges in opposite rotational directions. By rotating the tubular wedges in opposite directions, the bend is adjusted within a single (e.g. vertical) plane. Thus, no compensation is needed for a change in the fore-aft position of the end of the unloading tube.

The actuator system is for example further for setting a rotation angle of the second tube relative to the second tubular wedge. This may be used to adjust an angle of an end lip at the end of the unloading tube.

The actuator system for example comprises a second piston which drives a second actuator arm, wherein the second actuator arm is connected to the second end.

The bearings for example comprise slew bearings. These allow large loads and moments to be tolerated.

The slew bearings for example comprise a first slew bearing around the first outside end, a second slew bearing around the second outside and a third slew bearing around the first and/or second inside ends.

The bend enabled between the first and second tubes for example has a maximum of 10 degrees or less, for example less than 5 degrees, or less than 3 degrees. The length of the unloading tube means a small angular bend is sufficient to provide the desired movement of the unloading tube, for example a vertical movement range of around 100 cm (50 cm above and below horizontal) at the end of the grain unloading tube.

The invention also provides a grain unloading tube for a combine harvester, comprising:

a first tube having a first end face;

a second tube having a second end face;

the adjustable joint as defined above between the first end face and the second end face.

The grain unloading tube preferably further comprises:

a first auger section extending through the first tube;

a second auger section extending through the second tube; and a flexible union connecting the first and second auger sections. The flexible union is for example a constant velocity joint or a U-joint.

The adjustable joint is preferably formed in a transport section of the grain unloading tube, and the grain unloading tube further comprises a riser section, with an angled joint between the riser section and the transport section.

The invention also provides a combine harvester comprising:

a crop cutting head;

a threshing system;

a grain cleaning system for receiving the cut and threshed crop material;

a grain tank; and the grain unloading tube define above.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention/disclosure will now be described, by way of example only, with reference to the accompanying drawings, in which.

DETAILED DESCRIPTION

Figure 1:
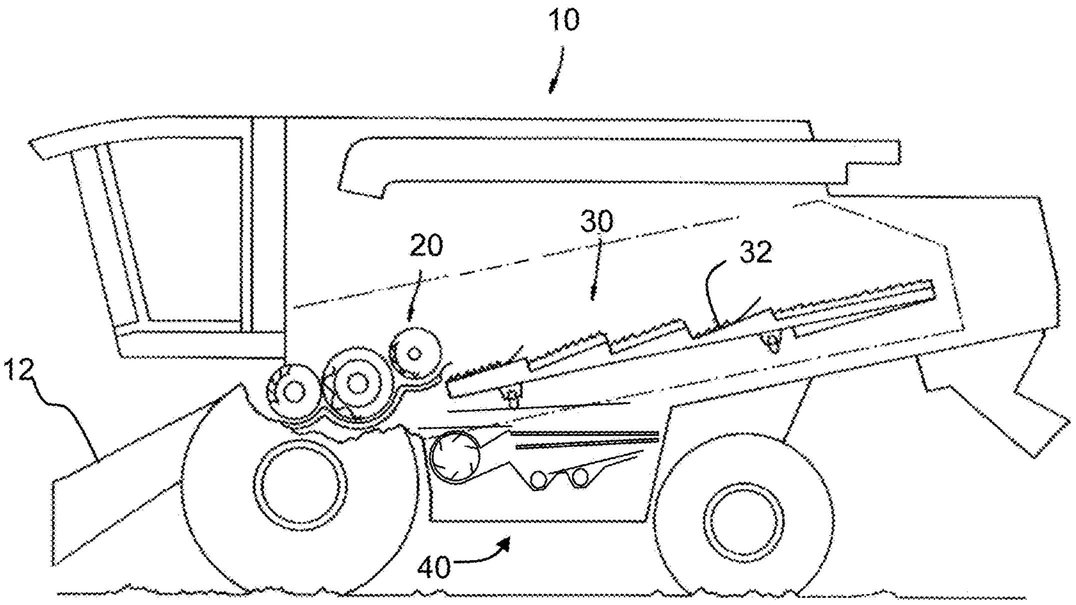
FIG. 1 shows a combine harvester which may be adapted in accordance with the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

This disclosure provides an adjustable joint to be provided along a tube, such as a grain unloading tube of a combine harvester. A bearing system is provided between the facing end of first and second tubes. allowing a controllable bend to be provided between the first tube and the second tube. The bearing system is actuated to control the bend. The bearing system has first and second first tubular wedges which face each other at the sloped ends, and bearings around the outside ends and the facing ends. A relative rotation angle is set between the first and second tubular wedges to set the degree of bend.

This disclosure relates to the design of the grain unloading tube. However, a general outline of a combine harvester will first be provided.

FIG. 1 shows a known combine harvester 10 to which the invention may be applied. The combine harvester includes a threshing system 20 for detaching grains of cereal from the ears of cereal, and a separating apparatus 30 which is connected downstream of the threshing system 20. The threshing system comprises one or more threshing units, in particular rotors, and associated concaves. In the example shown, the separating apparatus 30 includes a plurality of parallel, longitudinally-aligned, straw walkers 32, and this is suitable for the case of a so-called straw-walker combine. The grains after separation by the separating device 30 pass to a grain cleaning apparatus 40.

The combine harvester has a front elevator housing 12 at the front of the machine for attachment of a crop cutting head (known as the header, not shown). The header when attached serves to cut and collect the crop material as it progresses across the field, the collected crop stream being conveyed up through the elevator housing 12 into the threshing system 20.

In the example shown, the threshing system 20 is a tangential-flow 'conventional' threshing system, i.e. formed by rotating elements with an axis of rotation in the side-to-side direction of the combine harvester and for generating a tangential flow. For example, the 'conventional' threshing system includes a rotating, tangential-flow, threshing cylinder and a concave-shaped grate. The threshing cylinder includes rasp bars (not shown) which act upon the crop stream to thresh the grain or seeds from the remaining material, the majority of the threshed grain passing through the underlying grate and onto a stratification pan (also sometimes known as the grain pan).

There are also axial threshing systems, i.e. formed by rotating elements with an axis of rotation in the longitudinal direction (direction of travel). For example, the threshing section may have axially-aligned rasp bars spaced around the front section whilst the separating section has separating elements or fingers arranged in a pattern, e.g. a spiral pattern, extending from the rasp bars to the rear of the rotor.

Figure 2:
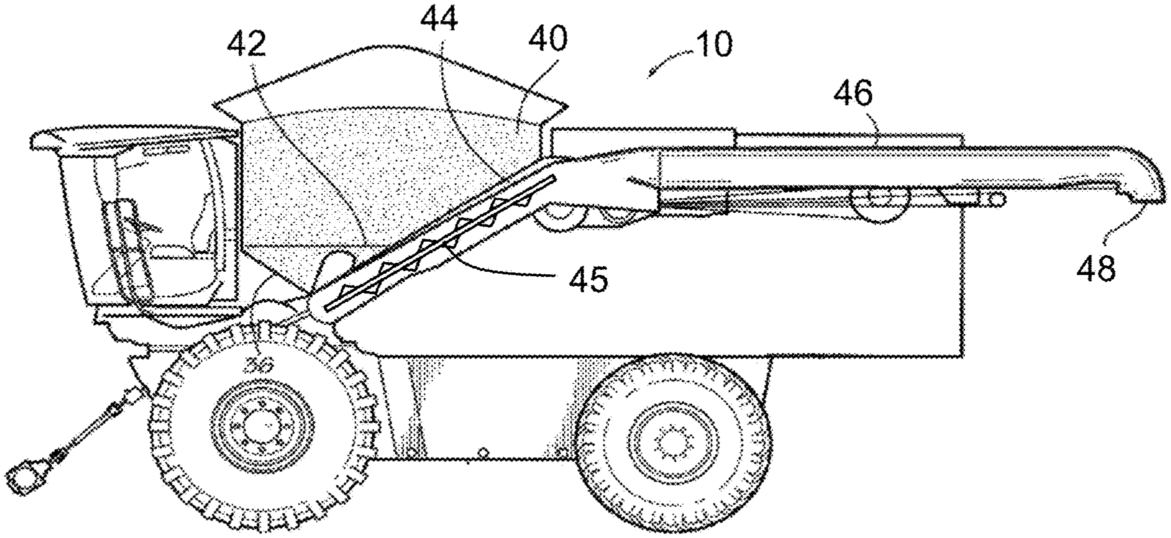
FIG. 2 shows an example of a grain unloading apparatus.

FIG. 2 shows the typical grain unloading system of the combine harvester 10. The cleaned grain delivered by the grain processing system is delivered by a grain collecting auger which conveys the grain to an onboard grain tank 80 located at the top of the combine harvester 10

A grain unloading system is used to unload the onboard grain tank 40. In this example, a sump 42 is positioned in a lower portion of the grain tank. The combination of gravity and a feeding mechanism, such as a drag auger (not shown), moves grain in the grain tank 40 into the sump 42. The sump 42 serves as an intake to an unloading tube 44, 46 that conveys the grain up and away from the grain tank 40 and into a transport vehicle. The unloading tube is for example is pivotally mounted on the chassis such that it can be pivotally rotated from a storage position alongside the combine harvester 10 as seen in FIG. 2 to an offload or discharge position away from the grain tank 40.

The unloading tube assembly has an inner riser section 44 and an outer transport section 46. A first end of the inner riser section 44 connects to the sump 42 in the lower portion of the grain tank 40. The outer transport section 46 has a grain nozzle 48 at its outer end to direct the flow of grain into the transport vehicle. The inner riser section 44 includes a grain unloading auger 45 with a shaft and helical flights that rotate in the inner riser section 44 to lift the grain to the outer transport section. The outer transport section also includes an internal auger, and the two augers are coupled to rotate together. The augers are driven by a belt arrangement.

This disclosure relates to the design of a bendable coupling provided along the transport section 46.

Figure 3:
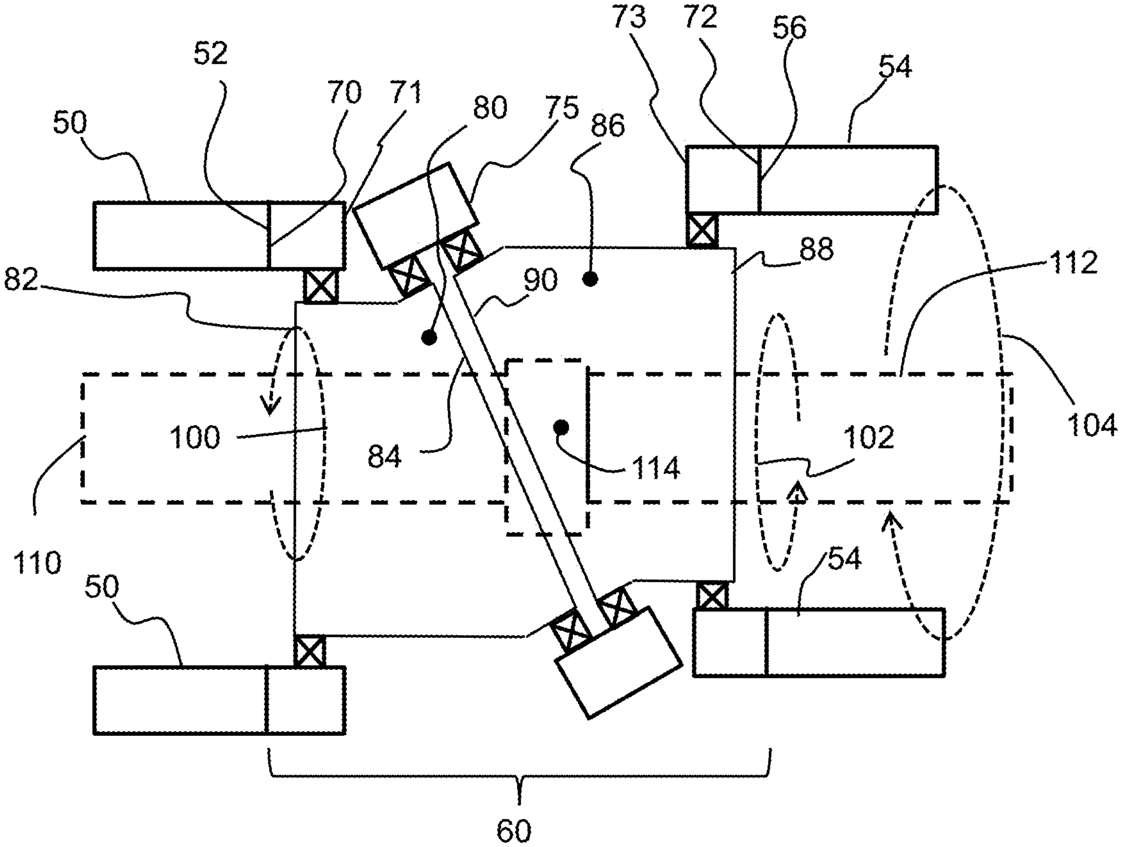
FIG. 3 is used to explain the concept of the invention in schematic form and shows the transport section of a grain unloading tube.

FIG. 3 is used to explain the concept of the invention in schematic form and with exaggerated angles. It shows the transport section of a grain unloading tube. The grain unloading tube comprises a first tube 50 having a first end face 52 and a second tube 54 having a second end face 56.

An adjustable joint 60 is provided between the first end face 52 and the second end face 56. The adjustable joint comprises a first end 70 for connecting to the first end face of the first tube 50 and a second end 72 for connecting to the second end face of the second tube 54.

A bearing system is provided between the first end and the second ends 70,72, allowing a controllable bend to be provided between the first tube and the second tube. An actuator system (not shown in FIG. 3) controls the bend. The bearing system comprises a first tubular wedge 80 having a first outside end 82 lying in a plane parallel to the first end face 52 and a first inside end 84 lying in a plane offset from parallel to the first end face 52. A second tubular wedge 86 has a second outside end 88 lying in a plane parallel to the second end face 56 and a second inside end 90 lying in a plane parallel to the first inside end 84. The first and second inside ends 84, 90 face each other and are thus parallel with each other.

Bearings are provided around the first and second outside ends 82, 88 and the first and/or second inside ends 84, 90 so that the two tubular wedges are free to rotate relative to each other and relative to the first and second tubes 50, 54. The bearings comprise a first bearing ring 71 around the first outside end 82, a second bearing ring 73 around the second outside end 88 and a middle bearing ring 75 around the two inside ends of the tubular wedges. The bearing rings are all circular. The tubular wedges thus each provide a transition between a first circular bearing surface and a second circular bearing surface, but those surfaces are not parallel to each other. The middle bearing ring 75 is annular and lies in the same plane as the inside ends 84,90. The tubular shape of the annular bearing ring 75 thus has its axis perpendicular to the inside ends 84,90. The middle bearing ring may comprise a single bearing around one of the slanted ends 84, 90 and the bearing ring may be rigidly mounted to the other slanted end. However, the example shown, there are two annular bearings at the middle bearing ring 75, so that the middle bearing ring is free to rotate about both tubular wedges. This enables the two tubular wedges to be identical components.

The actuator system (not shown) is for setting a relative rotation angle between the first and second tubular wedges. In particular, the first and second tubular wedges are rotated in opposite rotational directions as shown by arrows 100 and 102. During adjustment of the angle between the tubular wedges, bearing ring 75 will rotate into a new angular orientation, so that it remains aligned with the interface between the inside ends 84,90.

Each tubular wedge comprises a generally tubular shape, with one perpendicular end face and one sloped end face. The sloped end faces have the same slope angle, such as 7.5 degrees for this particular application. However, for other applications requiring a larger range of movement, a larger slope angle can be used.

The rotation between the tubular wedges changes the angle of bend at the interface between them. The bend enabled between the first and second tubes for example has a maximum of 10 degrees or less each side of the straight configuration. The theoretical maximum bend is twice the slope angle. Furthermore, the maximum bend is limited by the maximum bend which can be applied to an auger joint (discussed below) within the adjustable joint. A typical maximum bend which can be applied to an auger joint is 45 degrees.

A typical maximum bend angle in each direction for this particular application is for example 5 degrees.

The length of the unloading tube means a small angular bend is sufficient to provide the desired movement of the unloading tube.

The adjustable joint thereby allows a bend to be controlled in the unloading tube, and in particular the transport section of the grain unloading tube. The controllable bend is used to lift and lower the end of the grain unloading tube.

The matching slopes and opposite rotation of the two tubular wedges mean the unloading tube can be moved in a single plane (e.g. a vertical raising and lowering plane) rather than in a circular motion as would be exhibited by using a single tubular wedge.

The actuator may optionally also be used to set a rotation angle of the second tube 54 relative to the second tubular wedge 86. This is shown by arrow 104. This may be used to adjust an angle of an end lip at the end of the unloading tube.

The unloading tube can also rotate in a horizontal plane (from a fore-aft direction to a lateral direction). This rotation is controlled by an elbow between the riser section and the transport section of the unloading tube, in known manner. The design of the elbow will not be explained in this document.

FIG. 3 also shows schematically a first auger section 110 extending within the first tube, a second auger section 112 extending within the second tube and a constant velocity joint 114 or U-joint between located where the bend is formed in the joint.

Figure 4:
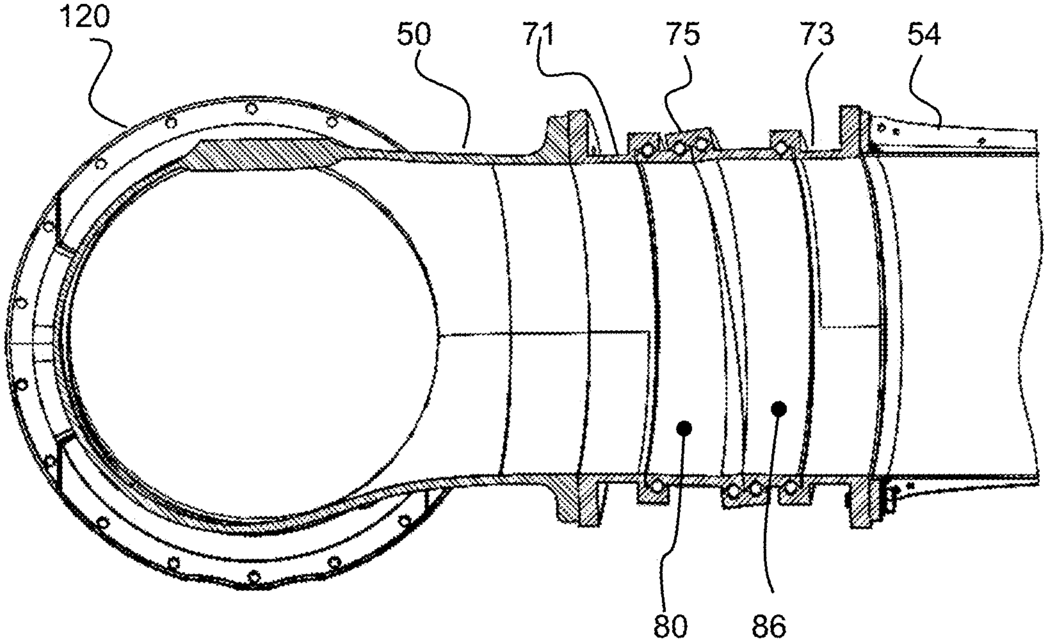
FIG. 4 shows a cross section, from above, of the adjustable joint.

FIG. 4 shows a cross section, from above, of the adjustable joint, showing the elbow 120 which leads to the first tube. It shows that the bearings are slew bearings, comprising a ring of ball bearing around the opposite ends of each tubular wedge. There are thus four rings of bearings. They may be considered to comprise a first slew bearing around the first outside end, a second slew bearing around the first and second inside ends and a third slew bearing around the second outside end.

Figure 5:
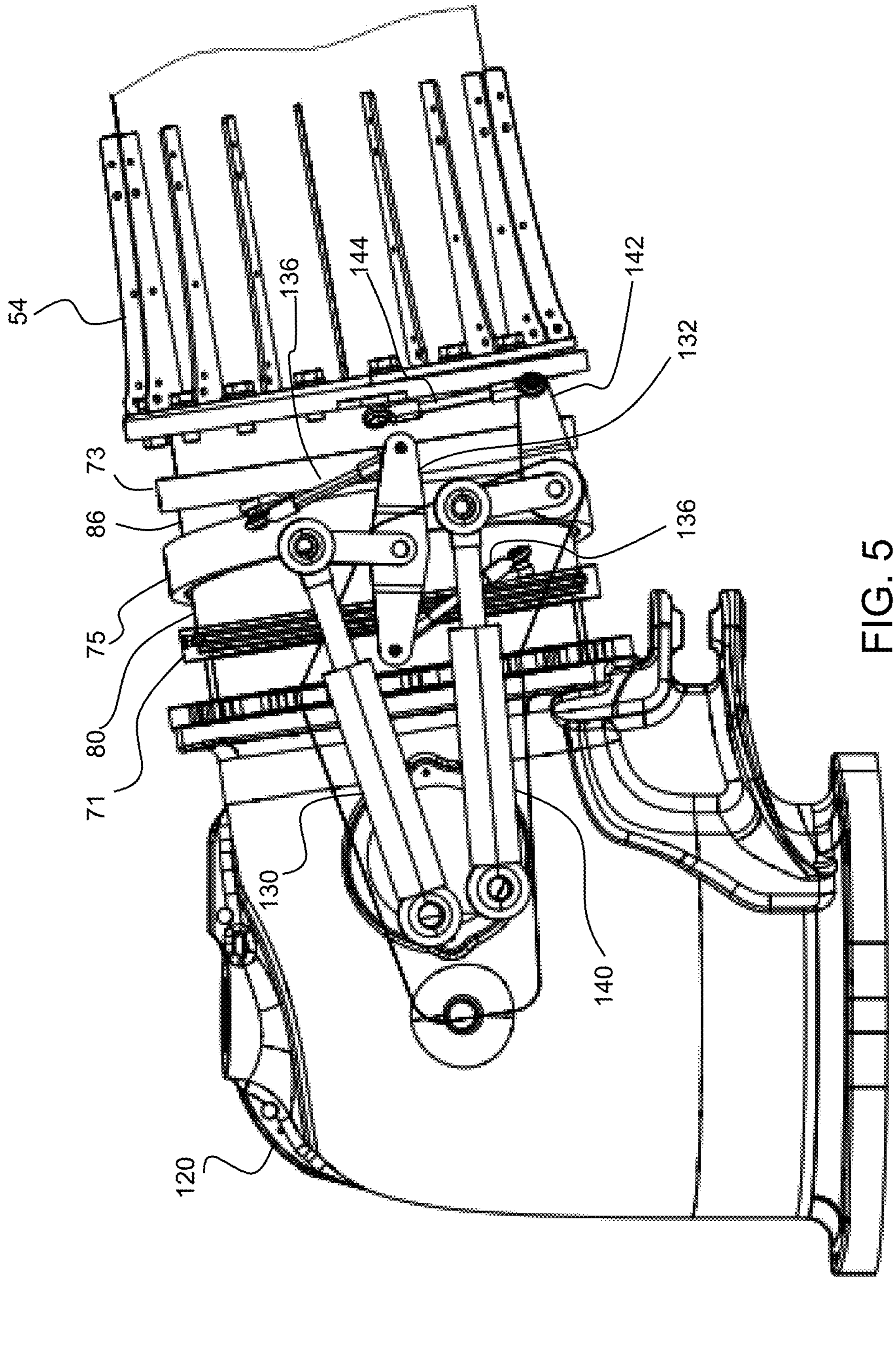
FIG. 5 shows the adjustable joint more clearly in side view.

FIG. 5 shows the adjustable joint more clearly in side view, between the first tube (which leads immediately to the elbow 120) and the second tube. FIG. 5 also shows the actuator system for controlling the adjustable joint. A cover plate 128 is shown as transparent in FIG. 5 to reveal the linkages of the actuator system. There may be a single actuator system, or there may two actuator systems on opposite sides to provide more balanced adjustment forces.

The actuator system comprises a first piston 130 which drives an actuator arm 132. The actuator arm 132 is connected to the first and second tubular wedges 80, 86 for rotating the first and second tubular wedges in opposite rotational directions, about a central pivot 134. The ends of the actuator arm 132 connect to the tubular wedges by connecting rods 136. Thus a pivot and arm system couples the first piston to the first and second tubular wedges.

A second piston 140 drives a second actuator arm 142, wherein the second actuator arm is connected to the second end face through a connecting rod 144.

Figure 6:
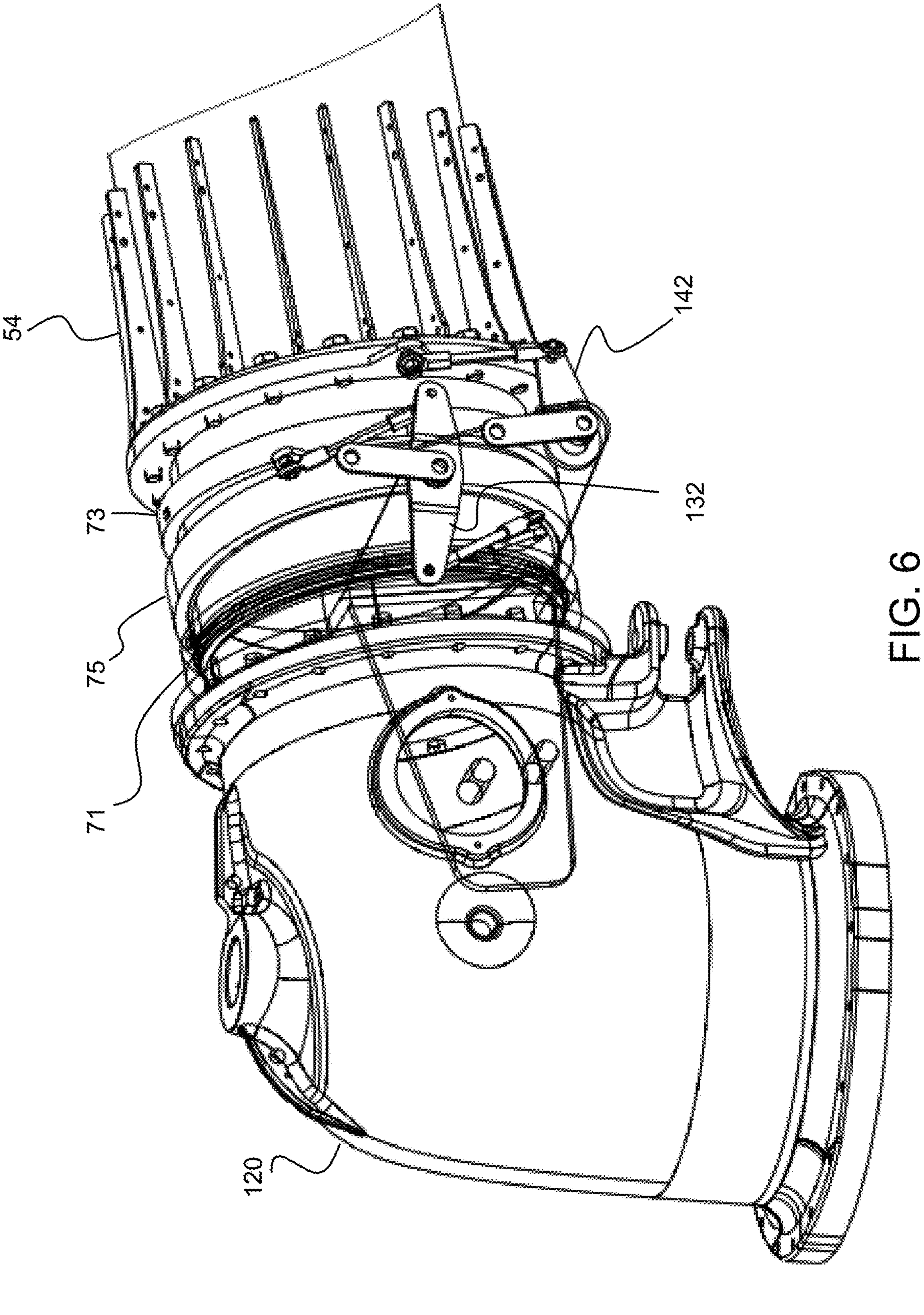
FIG. 6 shows the adjustable joint more clearly in perspective view with the pistons removed to show the actuator arms more clearly.

FIG. 6 shows the adjustable joint more clearly in perspective view with the pistons removed to show the actuator arms 132, 142 more clearly. They pivot about fixed rotation points, fixed to the support bracket (which is shown as transparent to enable the linkages behind to be seen). In FIGS. 5 and 6, the first bearing ring is also shown transparent so that the ring of ball bearings can be seen.

Figure 7:
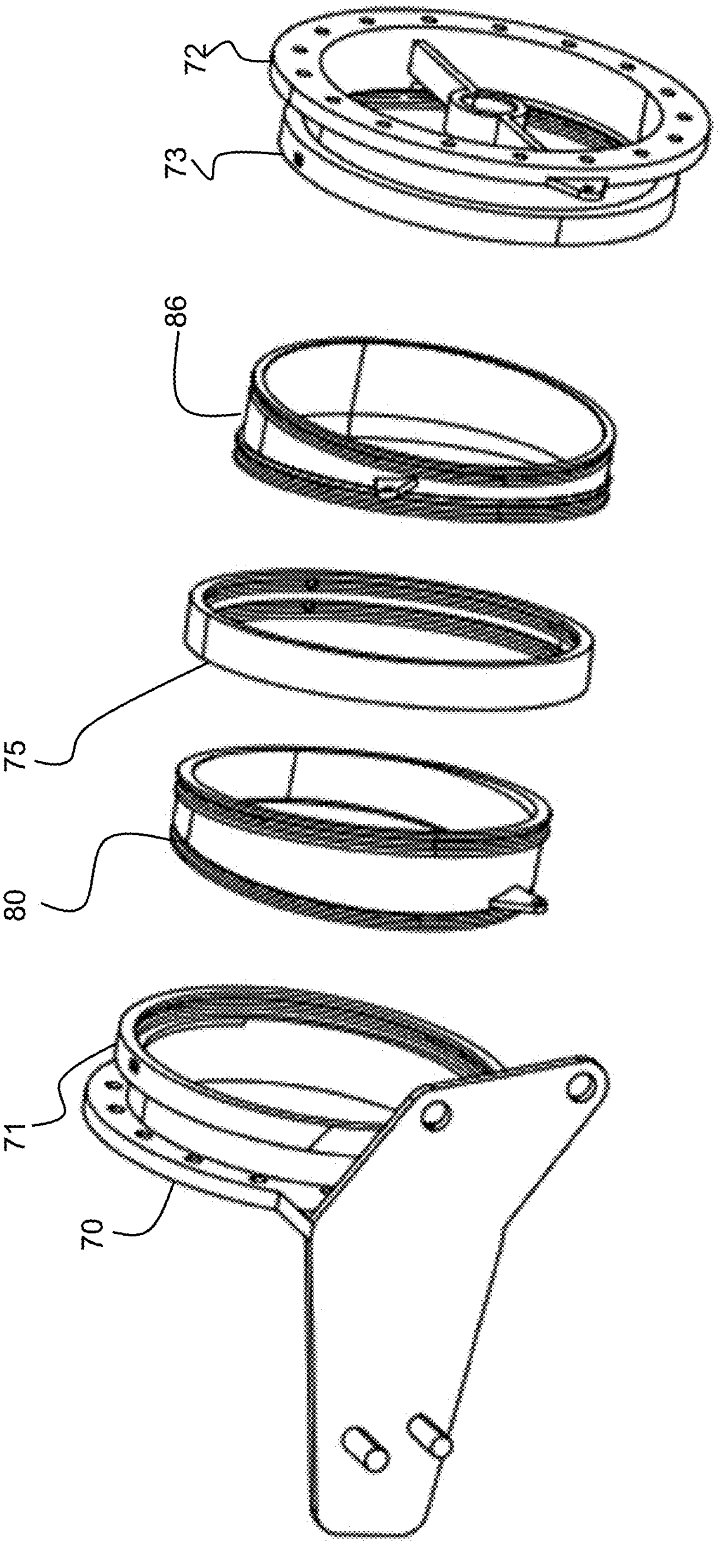
FIG. 7 shows an exploded view of the components of the adjustable joint.

FIG. 7 shows an exploded view of the components of the adjustable joint. As explained above, the components comprise a first end 70 for connecting to the first tube and a second end 72 for connecting to the second tube.

The first and second tubular wedges 80, 86 are shown. The three outer bearing rings 71, 73, 75 are also shown.

Figure 8:
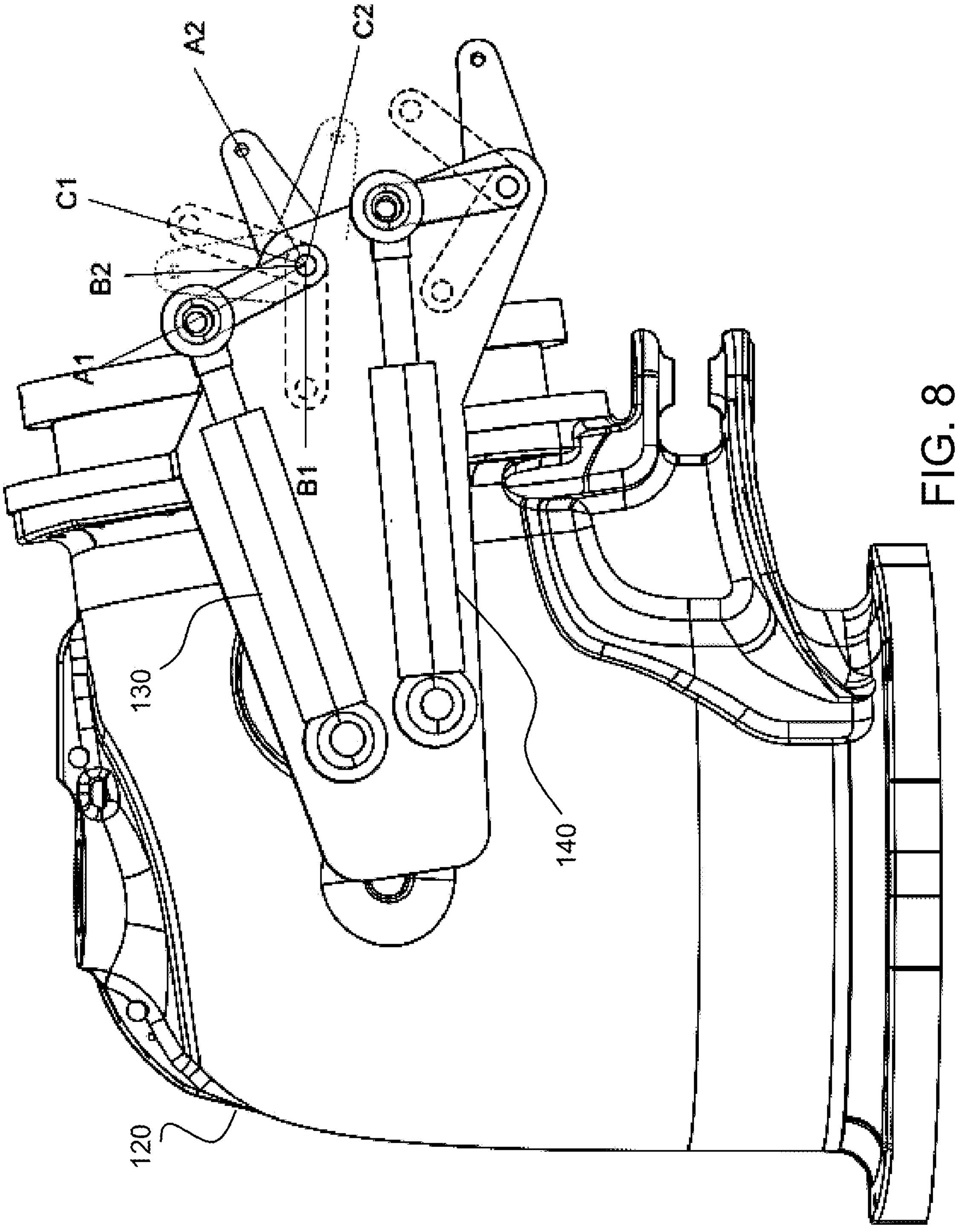
FIG. 8 shows the adjustable joint and shows the range of adjustment of the first actuator arm and the second actuator arm.

FIG. 8 shows the adjustable joint and shows the range of adjustment of the first actuator arm 132 and the second actuator arm 142. The central position of the first actuator arm gives the position shown as A1 (for a radial rod) and A2 (for a lateral rod that connects to the second tubular wedge). Actuation of the piston in one direction results in positions B1 and B2 and actuation in an opposite direction results in positions C1 and C2. The second actuator arm has the radial rod position adjustable between the two dotted extremes.

Figure 9:
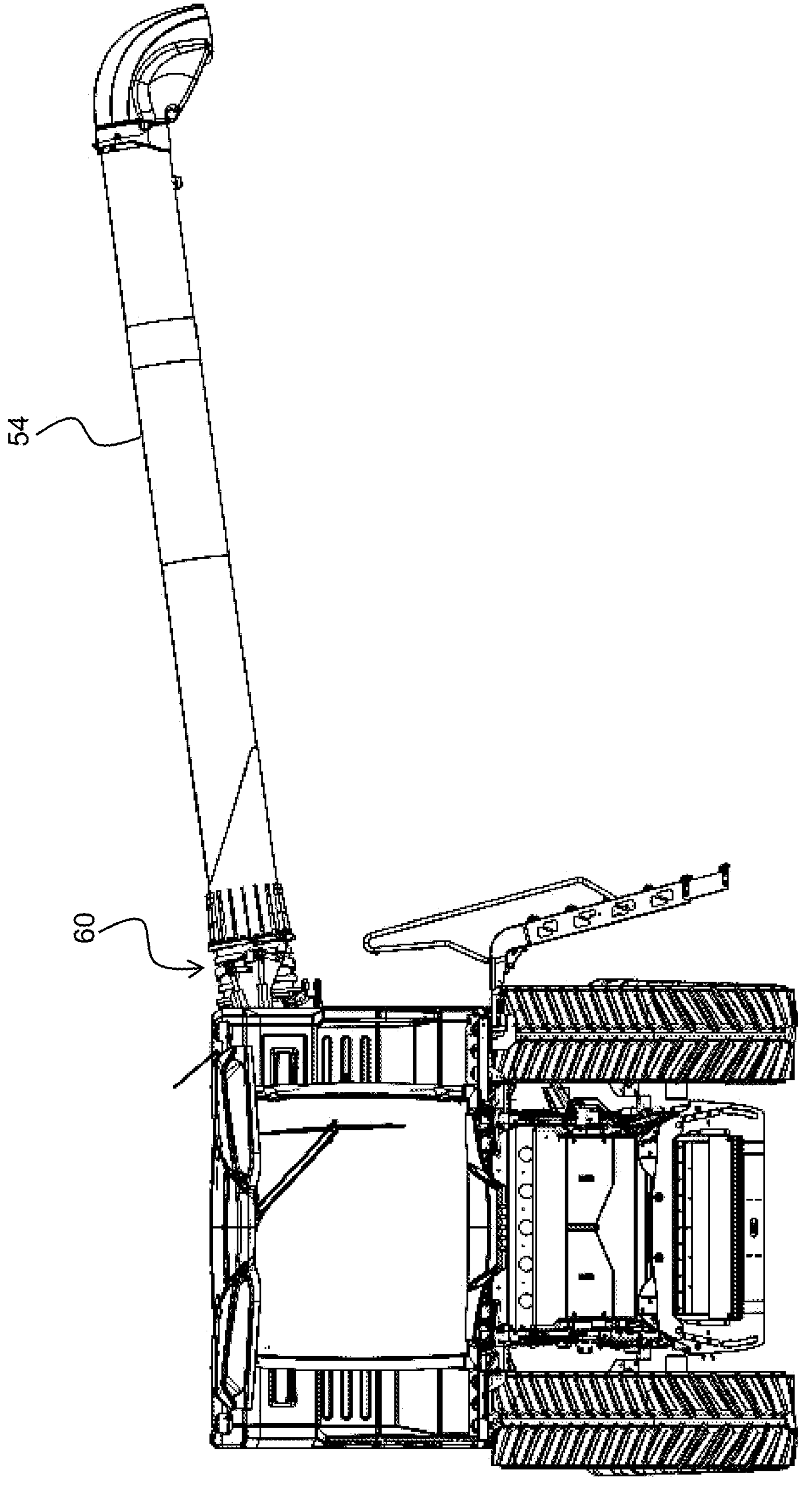
FIG. 9 shows a combine harvester with the unloading tube extended laterally, by rotating the elbow in known manner, and shows a central position in which the adjustable joint is straight.

FIG. 9 shows a combine harvester with the unloading tube extended laterally, by rotating the elbow in known manner. FIG. 9 shows a central position in which the adjustable joint is straight.

Figure 10:
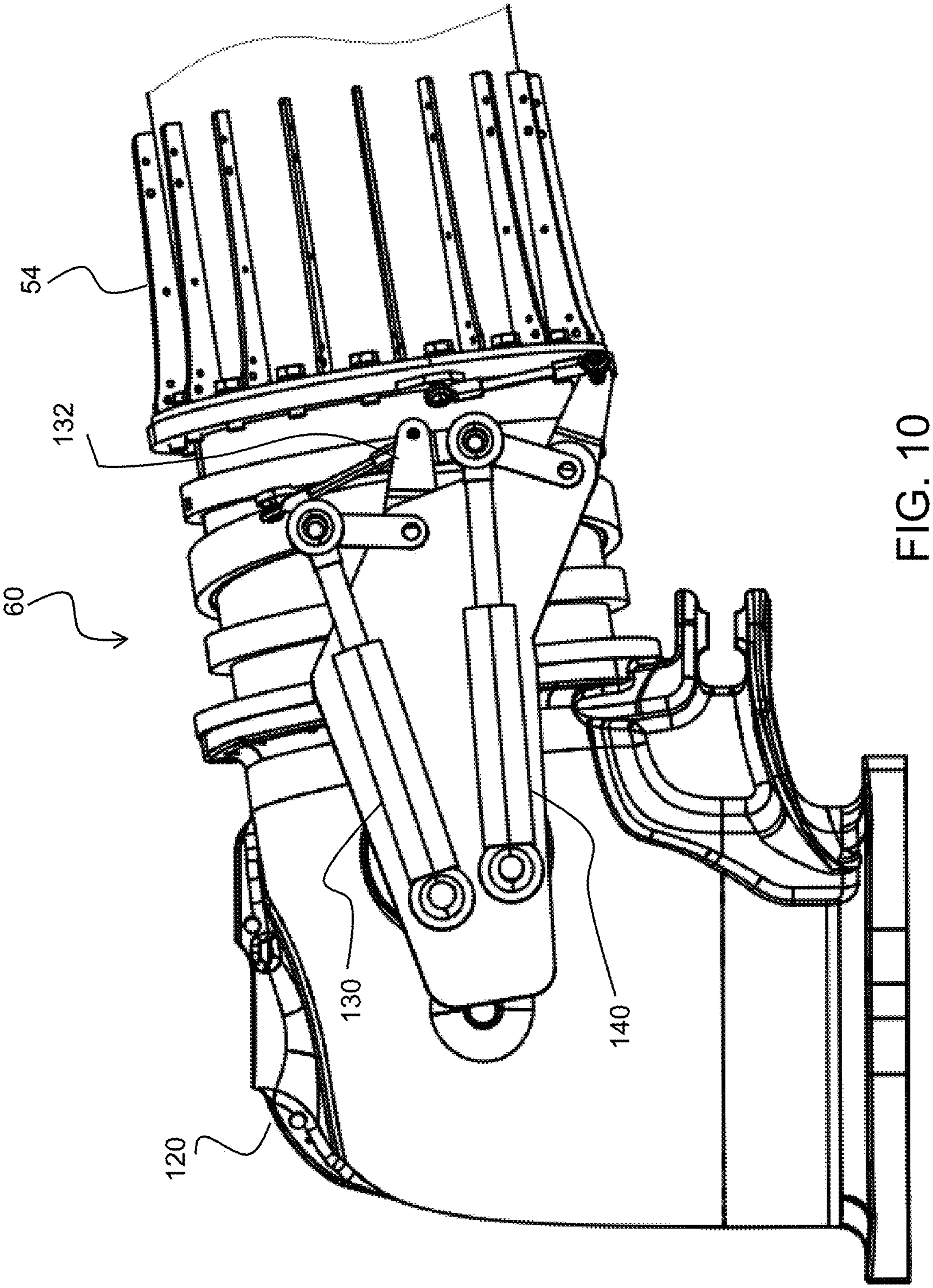
FIG. 10 shows the actuator positions for the configuration of FIG. 9.

FIG. 10 shows the actuator positions for the configuration of FIG. 9. The first piston 130 is at an intermediate positon so that the actuator arm 132 is also at an intermediate position. The sloped surfaces of the tubular wedges are perfectly aligned to form a straight line.

Figure 11:
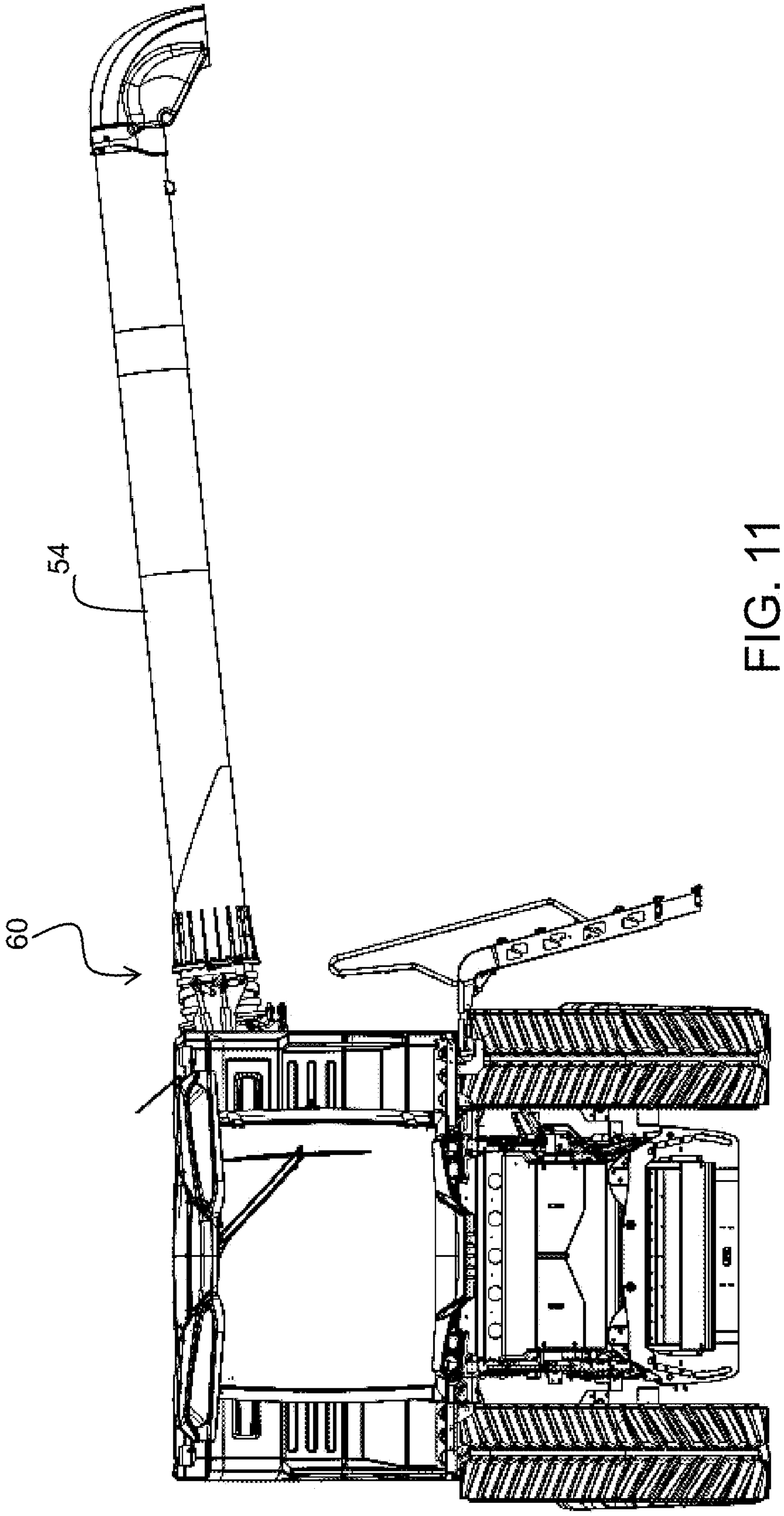
FIG. 11 shows the combine harvester with the unloading tube in a lowered position so there is a downward bend.

FIG. 11 shows the combine harvester with the unloading tube extended laterally and in a lowered position so there is a downward bend (of e.g. 5 degrees).

Figure 12:
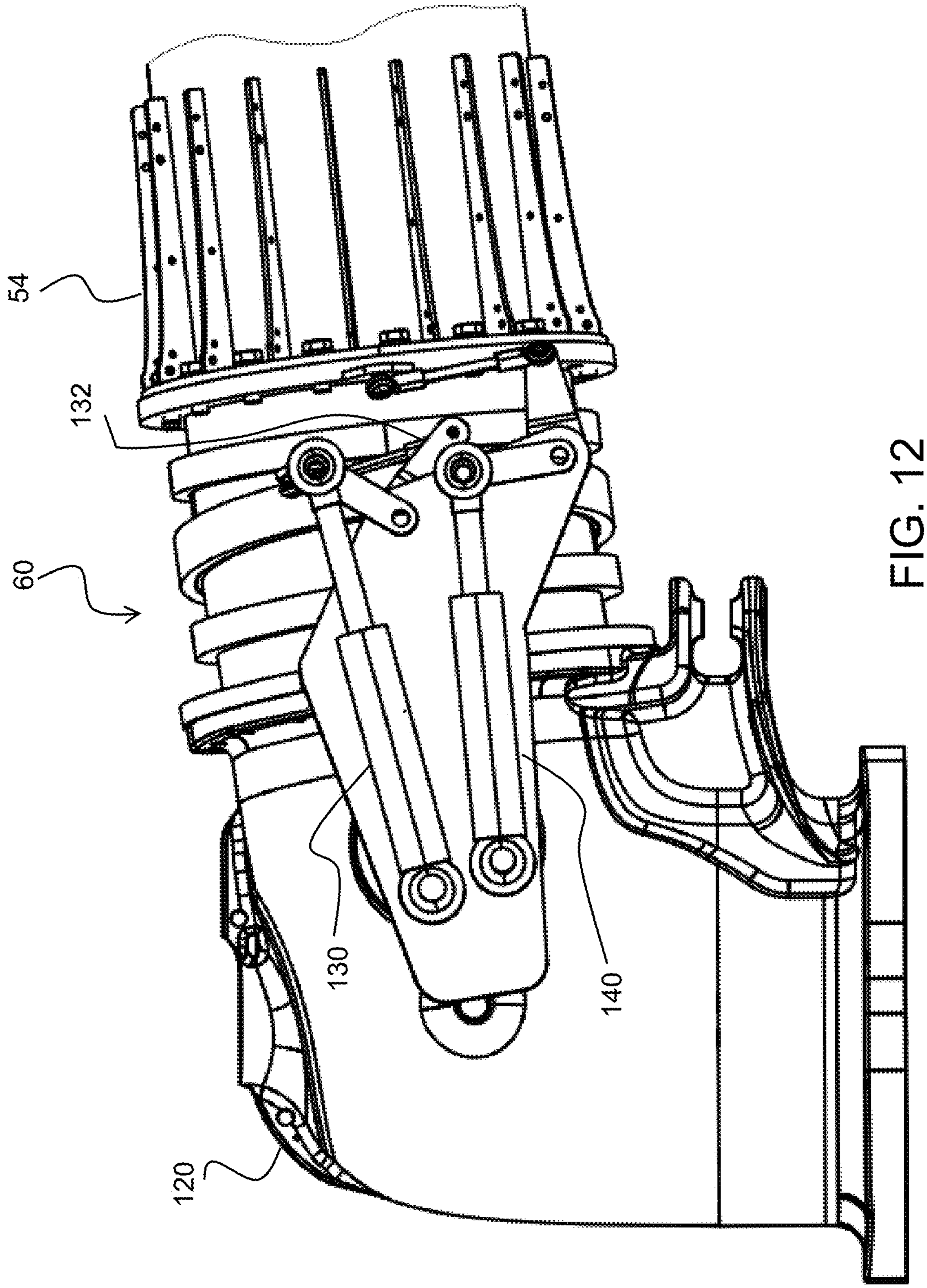
FIG. 12 shows the actuator positions for the configuration of FIG. 11.

FIG. 12 shows the actuator positions for the configuration of FIG. 11. The first piston 130 is at an extended positon so that the actuator arm 132 is also at a rotated position. The sloped surfaces of the tubular wedges have been rotated oppositely so that a vertically downward bending has been achieved.

Figure 13:
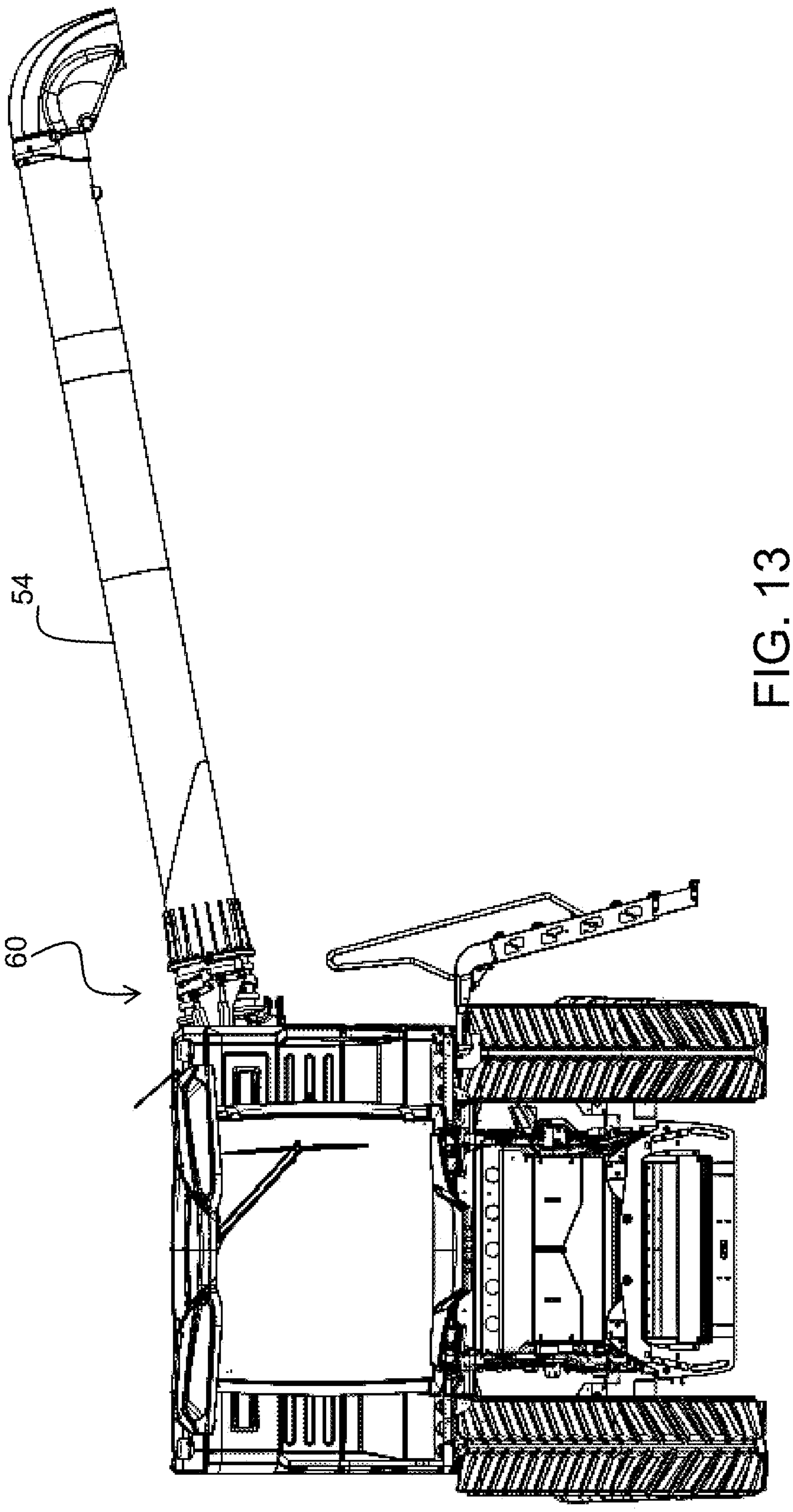
FIG. 13 shows the combine harvester with the unloading tube in a raised position so there is an upward bend.

FIG. 13 shows the combine harvester with the unloading tube extended laterally and in a raised position so there is an upward bend (of e.g. 5 degrees).

Figure 14:
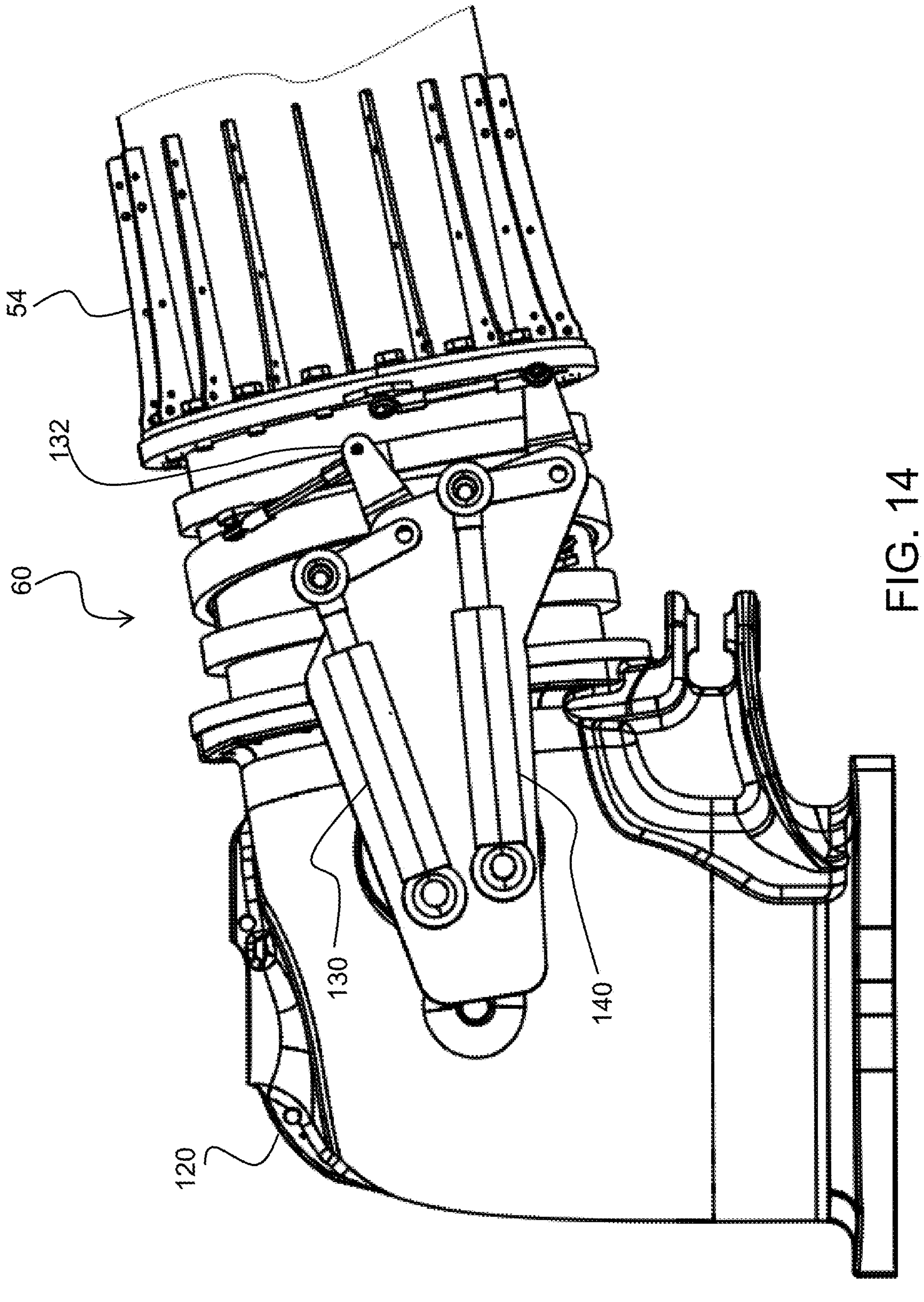
FIG. 14 shows the actuator positions for the configuration of FIG. 13.

FIG. 14 shows the actuator positions for the configuration of FIG. 13. The first piston 130 is at a retracted positon so that the actuator arm 132 is also at a rotated position. The sloped surfaces of the tubular wedges have been rotated oppositely so that a vertically upward bending has been achieved.

Figure 15:
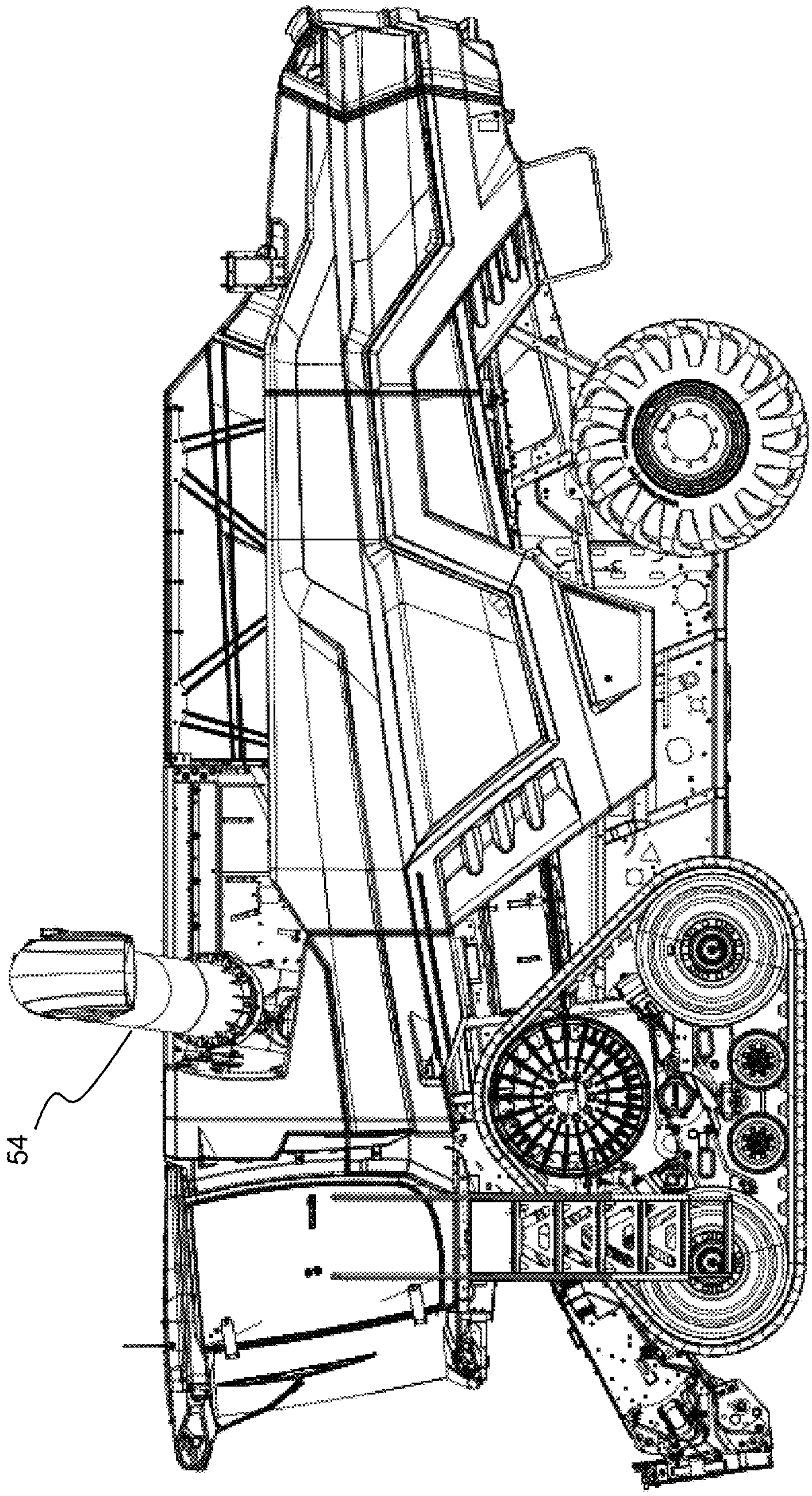
FIG. 15 shows the combine harvester from the side, again with the unloading tube extended laterally and with the outlet lip pointing downwardly.

FIG. 15 shows the combine harvester from the side, again with the unloading tube extended laterally and (for example) in the middle height position, and with the outlet lip pointing downwardly.

Figure 16:
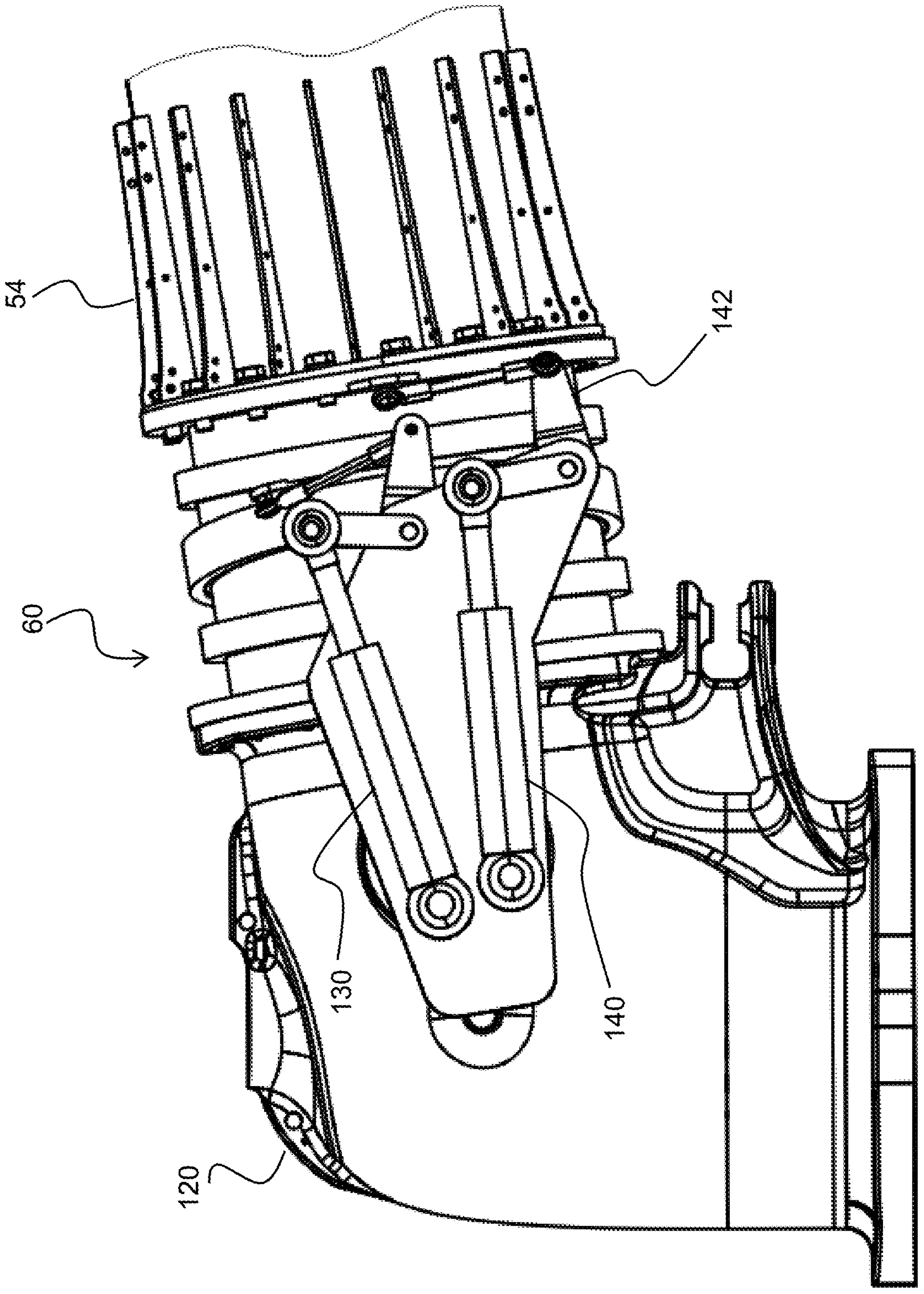
FIG. 16 shows the actuator positions for the configuration of FIG. 15.

FIG. 16 shows the actuator positions for the configuration of FIG. 15. The second piston 140 is at a central positon so that the actuator arm 142 is also at a central position.

Figure 17:
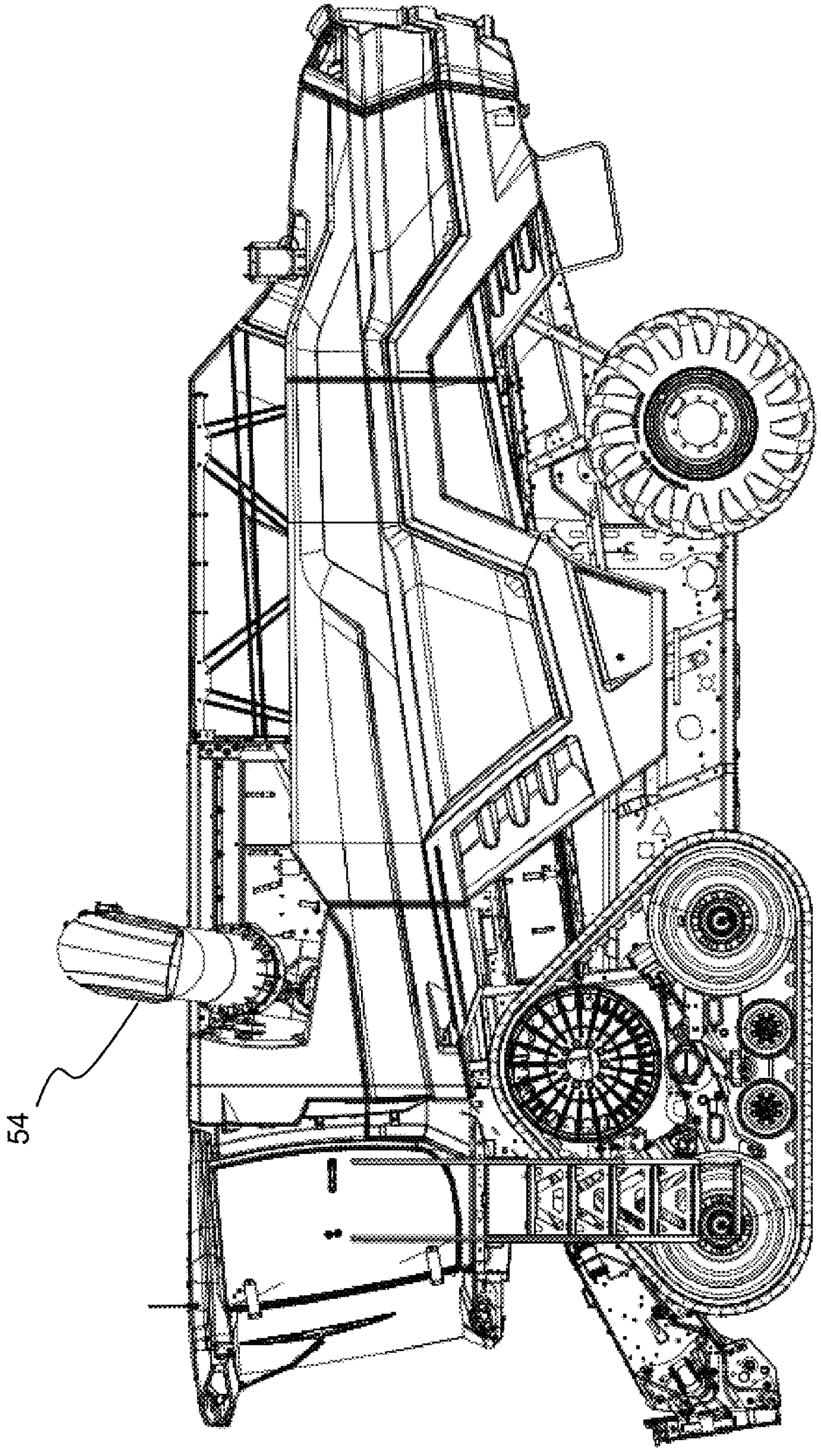
FIG. 17 shows the combine harvester from the side with the outlet lip pointing toward the front of the combine harvester.

FIG. 17 shows the combine harvester from the side, again with the unloading tube extended laterally and again in the middle height position, and with the outlet lip pointing to the left (as viewed in FIG. 17) i.e. toward the front of the combine harvester.

Figure 18:
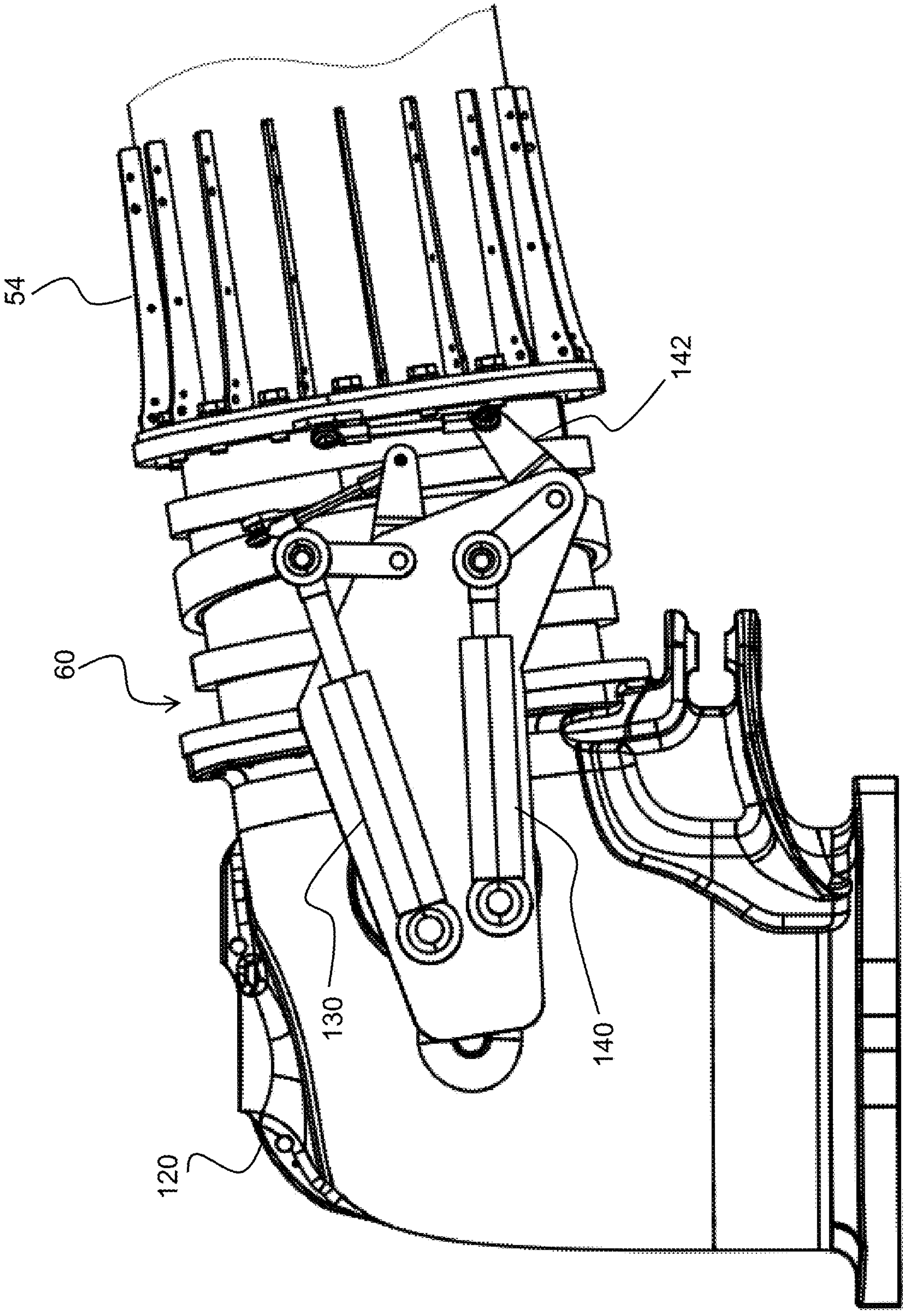
FIG. 18 shows the actuator positions for the configuration of FIG. 17.

FIG. 18 shows the actuator positions for the configuration of FIG. 17. The second piston 140 is at a retracted position so that the actuator arm 142 is also at a rotated position, rotating the second tube 54 anticlockwise.

Figure 19:
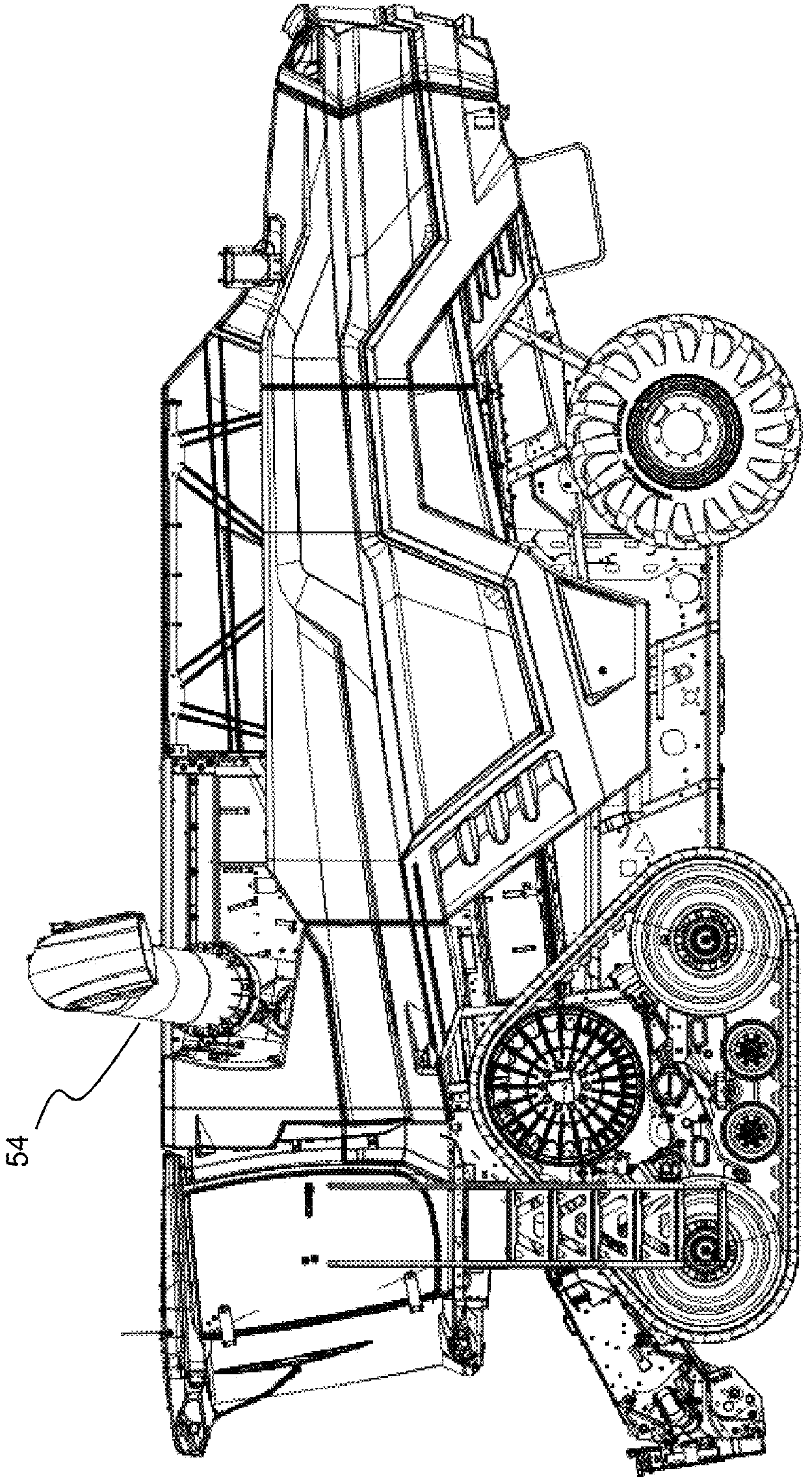
FIG. 19 shows the combine harvester from the side with the outlet lip pointing toward the rear of the combine harvester.

FIG. 19 shows the combine harvester from the side, again with the unloading tube extended laterally and again in the middle height position, and with the outlet lip pointing to the right (as viewed in FIG. 19) i.e. toward the rear of the combine harvester.

Figure 20:
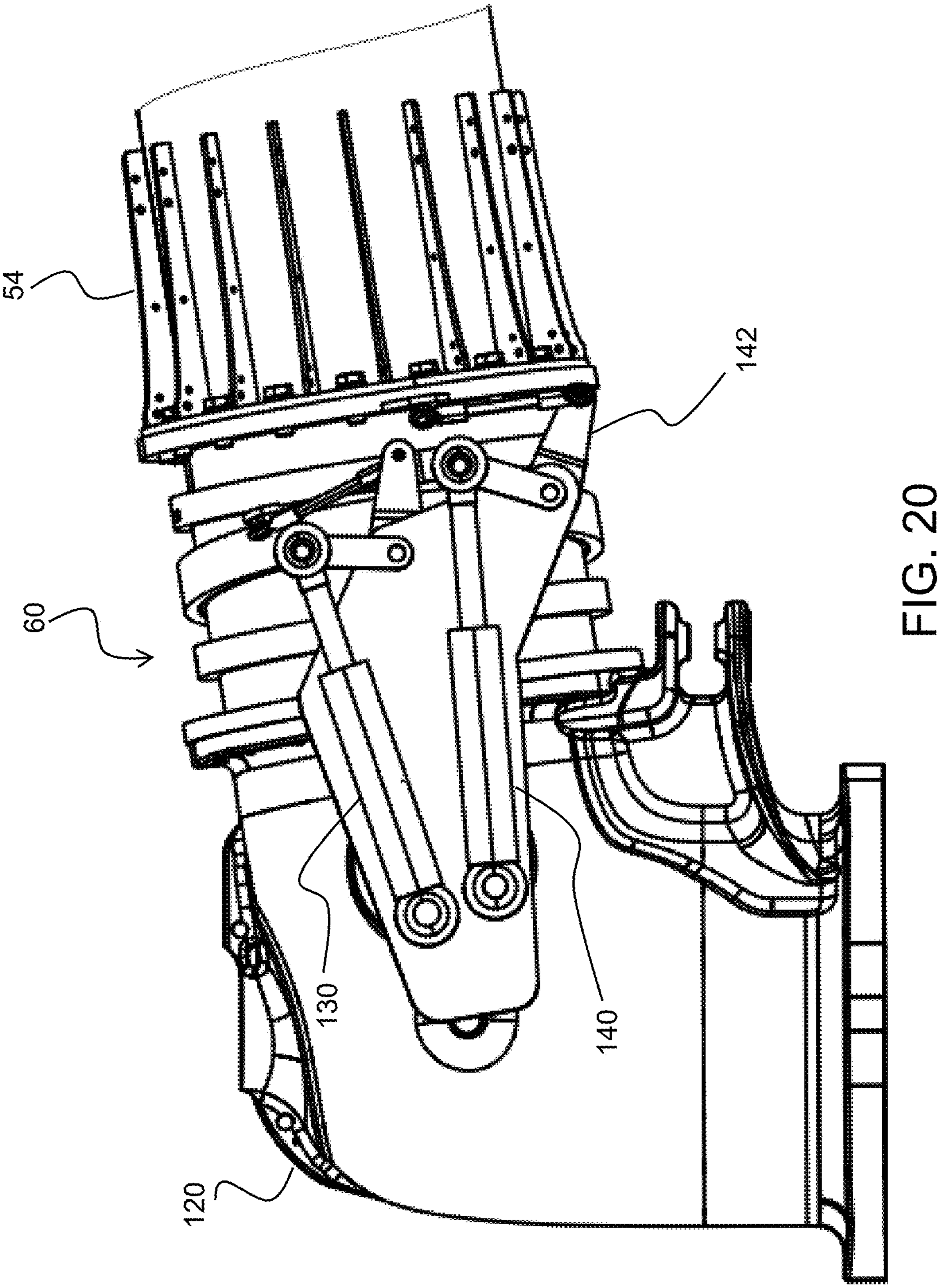
FIG. 20 shows the actuator positions for the configuration of FIG. 19.

FIG. 20 shows the actuator positions for the configuration of FIG. 19. The second piston 140 is at an extended position so that the actuator arm 142 is also at a rotated position, rotating the second tube 54 clockwise.

The height adjustment is a main function of the adjustable connection. The spout angle adjustment is an optional additional feature. As will be understood from the discussion above, they are independent functions, which may be used alone or in combination.

The adjustment of the spout angle and the height adjustment are essentially controlled independently by the two actuators. However, the height adjustment may incur a small spout angle change (and a spout angle adjustment may incur a small height change), and this correlation between the two adjustments may be corrected by providing an actuator drive scheme that controls both actuators in unison to achieve the desired bend angle and spout angle.

The counter-rotation of the two tubular wedges for example give a maximum angle between them of 90 degrees or less (hence a maximum adjustment of each tubular wedge angle by a rotation of 45 degrees or less).

The angle adjustment for example takes place dynamically while the combine harvesting takes place, to provide adjustment for a changing height difference between the combine harvester and the grain trailer, caused by the ground surface shape. This adjustment is for example controlled automatically based on feedback sensing.

Figure 21:
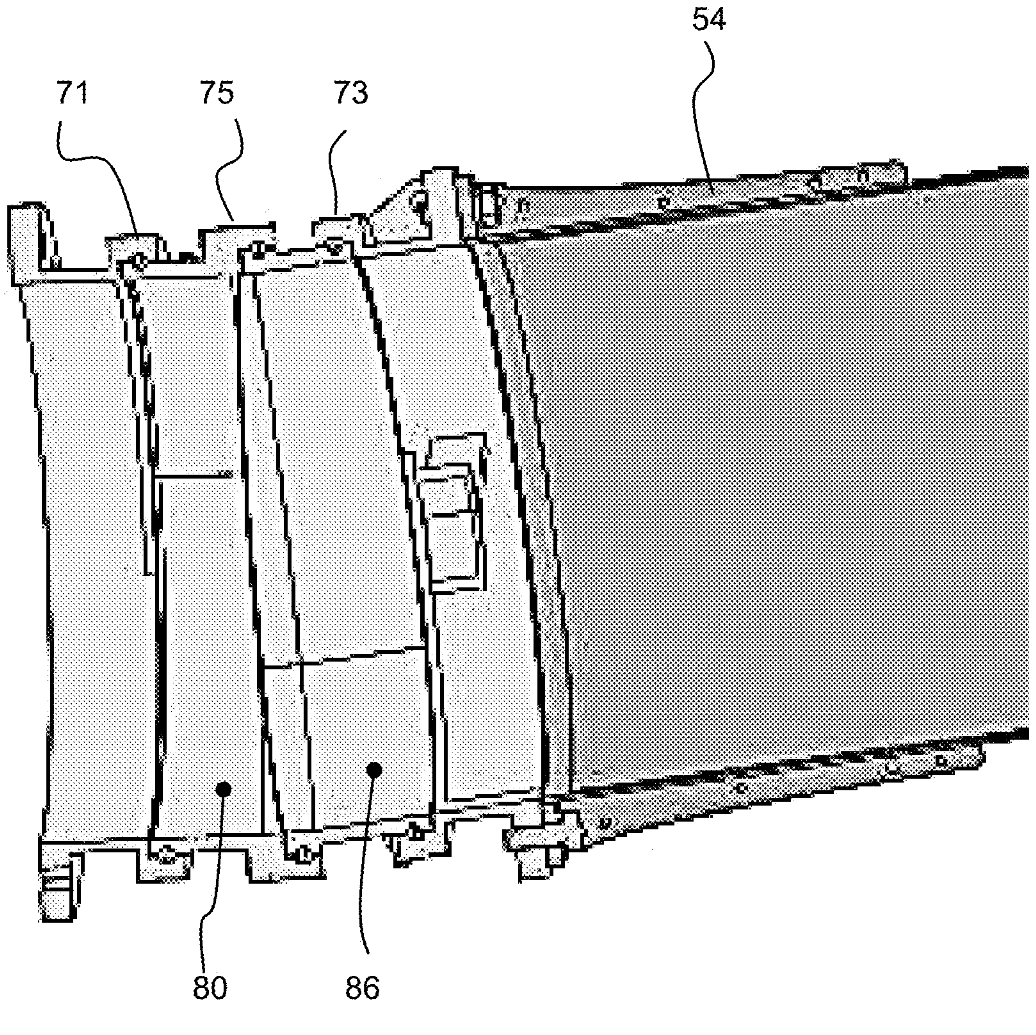
FIG. 21 shows an alternative design of the adjustable joint in cross section.

In the example above, there are four bearing rings, including two bearing rings around the facing sloped surfaces of the tubular wedges. This allows the two tubular wedges to be identical components, rotated 180 degrees relative to each other (when there is no bend). In such a case, the middle bearing ring 75 is free to rotate relative to both of the tubular wedges 80, 86. However, the middle bearing ring 75 may be fixed to one of the tubular wedges (or be an integral part of one of the two tubular wedges) so that only a single central bearing ring is needed, giving three in total. This option is shown in FIG. 21, with the bearing ring 75 an integral part of the first tubular wedge 80.

In the example above, the controlled movement is preferably in a vertical plane. However, other movements are possible. For example if only one tubular wedge is rotated (instead of counter-rotating both tubular wedges), a bend in the horizontal plane may be implemented. Thus, the actuator system could be designed to enable different types of bend control to that described above.

The invention has been described with reference to a grain unloading system of a combine harvester. However, it may be used for a grain cart, or indeed any application where a flow of material is required along a tube, and it is desired to have an adjustable angle implemented along that tube.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

All references cited herein are incorporated herein in their entireties. If there is a conflict between definitions herein and in an incorporated reference, the definition herein shall control.

What is claimed is:

1. An adjustable joint to be provided between first and second tubes, comprising:

a first end for connecting to the first tube;

a second end for connecting to the second tube;

a bearing system between the first end and the second end, allowing a controllable bend to be provided between the first tube and the second tube; and an actuator system for controlling the bearing system to control the bend, wherein the bearing system comprises:

a first tubular wedge having a first outside end lying in a plane parallel to the first end and a first inside end lying in a plane offset from parallel to the first end;

a second tubular wedge having a second outside end lying in a plane parallel to the second end and a second inside end lying in a plane parallel to the first inside end, the first and second inside ends facing each other; and bearings around the first and second outside ends including a first bearing ring around the first outside end, a second bearing ring around the second outside end, and a middle bearing ring around one or both of the first and second inside ends of the tubular wedges, and wherein the actuator system is for setting a relative rotation angle between the first and second tubular wedges.

2. The adjustable joint of claim 1, wherein the actuator system comprises a piston which drives an actuator arm, wherein the actuator arm is connected to the first and second tubular wedges for rotating the first and second tubular wedges in opposite rotational directions.

3. The adjustable joint of claim 1, wherein the actuator system is further for setting a rotation angle of the second tube relative to the second tubular wedge.

4. The adjustable joint of claim 3, wherein the actuator system comprises a second piston which drives a second actuator arm, wherein the second actuator arm is connected to the second end.

5. The adjustable joint of claim 1, wherein the bearings comprise slew bearings.

6. The adjustable joint of claim 5, wherein the slew bearings comprise a first slew bearing around the first outside end, a second slew bearing around the second outside end and a third slew bearing around the first and/or second inside ends.

7. The adjustable joint of claim 1, wherein the bend enabled between the first and second tubes has a maximum of 10 degrees or less.

8. A grain unloading tube for a combine harvester, comprising:

a first tube having a first end face;

a second tube having a second end face;

the adjustable joint of claim 1 between the first end face and the second end face.

9. The grain unloading tube of claim 8, further comprising:

a first auger section extending through the first tube;

a second auger section extending through the second tube; and a flexible union connecting the first and second auger sections.

10. The grain unloading tube of claim 8 wherein the adjustable joint is formed in a transport section of the grain unloading tube, and the grain unloading tube further comprises a riser section, with an angled joint between the riser section and the transport section.

11. The adjustable joint of claim 1, wherein middle bearing ring has an axis perpendicular to the inside ends.

12. The adjustable joint of claim 1, wherein the middle bearing ring comprises two annular bearings at the middle bearing ring so that the middle bearing ring is free to rotate about both the first and the second tubular wedges.

13. A combine harvester comprising:

a crop cutting head;

a threshing system;

a grain cleaning system for receiving cut and threshed crop material;

a grain tank; and the grain unloading tube of claim 10.

* * * * *